United States Patent [19]

Riedel et al.

[11] Patent Number: 5,748,615

[45] Date of Patent: May 5, 1998

[54] METHOD AND CIRCUIT ARRANGEMENT FOR FORWARDING MESSAGE CELLS TRANSMITTED VIA AN ATM COMMUNICATION EQUIPMENT TO A SERVING TRUNK

[75] Inventors: Michael Riedel, Dresden; Herbert Heiss, Germering, both of Germany

[73] Assignee: Siemens Aktiengesellschaft, Munich, Germany

[21] Appl. No.: 610,477

[22] Filed: Mar. 4, 1996

[30] Foreign Application Priority Data

Mar. 3, 1995 [DE] Germany ............... 195 07 570.6

[51] Int. Cl.[6] ........................................... H04L 12/56
[52] U.S. Cl. ........................... 370/238; 370/253; 370/395
[58] Field of Search .................................. 370/13, 17, 53, 370/58.1, 60, 60.1, 94.1, 94.2, 94.3, 229, 230, 231, 232, 233, 234, 235, 238, 252, 253, 389, 394, 395, 396, 397, 398, 399, 409, 412, 417, 418; 395/200.13, 200.53, 200.54, 200.55, 200.56, 200.57, 200.58

[56] References Cited

U.S. PATENT DOCUMENTS

| | | | |
|---|---|---|---|
| 5,276,676 | 1/1994 | Horn et al. | 370/17 |
| 5,339,332 | 8/1994 | Kammerl | 370/13 |
| 5,418,777 | 5/1995 | Worster | 370/17 |
| 5,515,363 | 5/1996 | Ben-Nun et al. | 370/17 |
| 5,524,006 | 6/1996 | Hluchyi et al. | 370/84 |
| 5,526,345 | 6/1996 | Wallmeier | 370/17 |
| 5,530,695 | 6/1996 | Dighe et al. | 370/17 |
| 5,533,009 | 7/1996 | Chen | 370/17 |
| 5,533,020 | 7/1996 | Byrn et al. | 370/60.1 |

FOREIGN PATENT DOCUMENTS

44 34 724 C1   11/1995   Germany.

Primary Examiner—Alpus H. Hsu
Assistant Examiner—Kwang B. Yao
Attorney, Agent, or Firm—Hill & Simpson

[57] ABSTRACT

During the course of virtual connections, message cells are transmitted via the ATM communication equipment (KE) working according to an asynchronous transfer mode and are forwarded to a serving trunk (A1, ..., An) coming into consideration for the respective virtual connection. Characteristic parameters corresponding to the traffic characteristic of the message cell stream to be transmitted are thereby determined for the respective virtual connection during the course of the call setup. Based on the criterion of these characteristic parameters, a time interval for the forwarding of a message cell to the serving trunk coming into consideration is determined for every message cell transmitted via the ATM communication equipment. It is thereby provided that the time interval for the respective message cell is only determined with the forwarding of a message cell of the same virtual connection that immediately precedes it.

10 Claims, 4 Drawing Sheets

METHOD AND CIRCUIT ARRANGEMENT FOR FORWARDING MESSAGE CELLS TRANSMITTED VIA AN ATM COMMUNICATION EQUIPMENT TO A SERVING TRUNK

BACKGROUND OF THE INVENTION

The invention is directed to a method and to a circuit arrangement for forwarding message cells transmitted via an ATM communication equipment to a serving trunk. Such a method and such a circuit arrangement are described in German Patent Application P 44 34 724.3 (corresponding to copending U.S. Ser. No. 08/531,704), which however is not prior art to the present invention. It is provided in this circuit arrangement that, with every appearance of a message cell transmitted via the ATM communications equipment, a time interval for the forwarding thereof is immediately defined on the basis of the characteristic parameters determined for the appertaining virtual connection. As a result of this immediate definition of a time interval, however, jitter with respect to the adherence to the individual, characteristic parameters can occur dependent on the traffic load and dependent on the plurality of wait lists to be potentially traversed by the individual message cells.

SUMMARY OF THE INVENTION

It is an object of the present invention to provide a method and a circuit arrangement in which message cells are realized in order to be able to guarantee the characteristic parameters defined for individual virtual connections.

In general terms the present invention is a method for forwarding message cells transmitted via an ATM communication equipment operating according to an asynchronous transfer mode during the course of virtual connections to a serving trunk for the respective virtual connection. Characteristic parameters for the respective virtual connection are determined during the course of the call setup according to the traffic characteristic of the message cell stream to be transmitted. A time interval for the forwarding of each message cell transmitted via the ATM communication equipment to the serving trunk is determined for each message cell based on the criterion of these characteristic parameters. The time interval for the respective message cell is only calculated with the forwarding of a message cell immediately preceding the respective message cell in the same virtual connection.

The present invention provides the advantage that, for example, the minimum time spacing between two successive message cells as well as arbitrary cell delay tolerances can be exactly guaranteed by the definition of a time interval for the forwarding of a message cell only at the time the message cell of the same virtual connection that immediately precedes it is forwarded.

A peak bit rate, an upper limit of the sustainable bit rate, a burst tolerance, as well as, a cell delay variation are respectively defined as characteristic parameters for the individual connections. The start time of the time interval is determined according to the criterion of the peak bit rate, the burst tolerance as well as the cell delay variation. The end time of the time interval is determined according to the criterion of the upper limit of the sustainable bit rate.

A time value indicating the last processing time of a message cell, a first leaky bucket parameter set allocated to the upper limit of the sustainable bit rate and to the burst tolerance as well as a second leaky bucket parameter set allocated to the peak bit rate and the cell delay variation are maintained for each virtual connection. The first leaky bucket parameter set contains a momentary filling value of the leaky bucket, a maximum value of the leaky bucket dependent on the burst tolerance as well as a time value as parameters. This time value corresponds to the time spacing of two successive message cells, taking the upper limit of the sustainable bit rate into account. The second leaky bucket parameter set contains a momentary filling value of the leaky bucket, a maximum value of the leaky bucket dependent on the cell delay variation as well as a time value as parameters. This time value corresponding to the time spacing of two successive message cells, taking the peak bit rate into account. The filling value is decremented to the value at the time of the forwarding of an immediately preceding message cell for determining the time interval for the forwarding of a message cell. The value resulting therefrom is incremented to the value as the current filling value and a delay value of is subsequently formed. The filling value is decremented to the value. The value resulting therefrom is incremented to as the current filling value, and a delay value is subsequently formed. The time value is set to the value for a following determination and the greater of the delay values and is selected as starting point of the time interval. The end time of the time interval is determined from the current filling value. The message cells to be forwarded in the course of virtual connections pass through call-associated cell waiting lists. Only one reference is kept for each cell waiting list that is not empty. The time interval in which the next message cell pending for forwarding in the appertaining cell waiting list is to be read out is defined for the respective reference. Two calendars are kept for the forwarding of the message cells, each calendar having a fixed time length as well as a plurality of time slots whose time length corresponds to the transmission time of a message cell on the respective serving trunk. A first of the calendars is allocated to the start times of time intervals, whereas the second calendar is allocated to the end times of time intervals. The reference to the respective cell waiting list is respectively entered into a readout list of a time slot of the first or, respectively, second calendar coming into consideration for the appertaining start time or, respectively, end time. It is entered therein according to the criterion of the start time and end time of the time interval calculated therefor. The respective reference in the readout list of the first or second calendar is taken into consideration dependent on the current traffic load. Two separate leaky bucket parameter sets are maintained for each virtual connection for the determination of the start time and of the end time of a time interval of a message cell. Two separate calendars respectively isochronically circulating with a uniformly defined cycle and each having a respectively fixed plurality of time slots are maintained for the start times and the end times. The two leaky bucket parameter sets are updated for the respective virtual connection if a predetermined time slot. The number of cycles of the calendars respectively devolving onto the start time and the end time is determined in the determination of a time interval and corresponding numerical values are maintained call-associated. The numerical values being maintained are respectively decremented by the value "1" with every updating of the leaky bucket parameter sets for the respective call. The previously determined start time or, respectively, end time in the appertaining calendar is only taken into consideration given a numerical value of "0".

The object of the present invention is achieved in a circuit arrangement for forwarding message cells transmitted via an ATM communication equipment working according to an asynchronous transfer mode during the course of virtual connections to a serving trunk coming into consideration for the respective virtual connection. Characteristic parameters for the respective virtual connection are determined by the ATM communication equipment during the course of the call setup according to the traffic characteristic of the message cell stream to be transmitted. A time interval for the forwarding of each message cell transmitted via the ATM communication equipment to the serving trunk coming into consideration is determined by a handling means allocated to the respective serving trunk for each message cell based on the criterion of these characteristic parameters supplied proceeding from the ATM communication equipment. The handling means has processing means that are structured such that the time interval for the respective message cell is only calculated with the forwarding of a message cell immediately preceding the message cell in the same virtual connection by the circuit-oriented features. The advantage of this circuit arrangement is that the determination of a time interval for a message cell to be forwarded at the time the message cell of the same connection that immediately precedes it is forwarded ensues exclusively in a handling means allocated to the respective serving trunk. The appertaining ATM communication equipment is thus relieved of such calculating jobs.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

DESCRIPTION OF THE PREFERRED EMBODIMENTS

Figure 1:
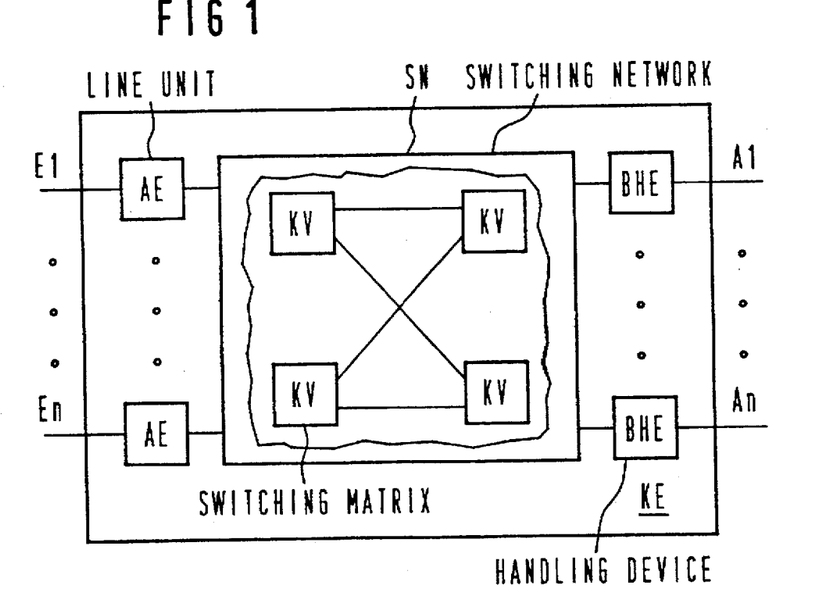
FIG. 1 schematically shows a communication equipment wherein the present invention is employed.

FIG. 1 schematically shows an ATM communication equipment KE operating according to an asynchronous transfer mode to which are connected a plurality of offering trunks E1, . . . , En as well as a plurality of serving trunks (arrangements) A1, . . . , An. Only the offering trunks E1, . . . , En and the serving trunk arrangements A1, . . . , An are indicated in FIG. 1. A transmission of message cells during the course of virtual connections respectively ensues according to an asynchronous transfer mode on the offering trunks and serving trunk arrangements. The message cells have a fixed length and, in addition to an information part for the transmission of the actual useful information, respectively have a cell header in which are contained, among other things, particulars with respect to the respective virtual connection or, respectively, the respective virtual path. Let the respective connection thereby be indicated by what is referred to as a virtual channel number VCI but a virtual path by what is referred to as a virtual path number VPI. The length of such a cell header is, for example 5 octets. This information part, by contrast, is formed of 48 octets in order to transmit the actual useful information. What is to be generally understood by useful information are communication signals in digital form, this including, for example, message and text signals as well as voice and video signals in digital form. Dummy cells corresponding to the message cells, moreover, are transmitted in transmission pauses.

According to FIG. 1, the offering trunks E1, . . . , En are respectively supplied to a switching network SN via a line unit AE. Ensuing individually, among other things, in these line units for the individual virtual connections conducted via the respective offering trunk is a check of the adherence to the parameters determined for the respective virtual connection. A multi-stage structure having a plurality of switching matrices KV connected to one another, moreover, is indicated in FIG. 1 merely as an example of the switching network SN. Arbitrary single-stage or multi-stage switching networks, however, can also be employed. Since the structure and functioning of such switching networks is known for forwarding message cells, this shall not be discussed in greater detail below. A more detailed explanation of the structure and functioning of the line units AE shall also not be discussed in more detail, since their fashioning is not the subject matter of the present invention and arrangements for monitoring defined parameters for the individual virtual connections are well known.

According to FIG. 1, a respective handling means BHE is allocated to the serving trunk arrangements A1, . . . , An in order to forward the message cells conducted via the switching network SN during the course of virtual connections to the respective output line arrangement. It is thereby assumed below that the respective handling means is supplied with message cells that belong to virtual connections having different traffic characteristics. Let a maximum bit rate thereby be respectively guaranteed for first connections, which are referred to below as RT connections (real time connections). Examples of such RT connections are voice connections as well as video conference calls. Over and above this, let what are referred to as NRT connections (non-real-time connections) be present that can be characterized by a peak bit rate, an upper limit of the average bit rate (sustainable bit rate), a burst tolerance as well as by a cell delay tolerance (cell delay variation). As examples of such NRT connections, let connections for file transfers, bookings or for mail services be cited here. The traffic characteristic deriving for a virtual connection is thereby indicated during the setup of the respective virtual connection with corresponding particulars from the subscriber equipment requesting this connection. Characteristic parameters corresponding to these particulars are retained in call-associated fashion in the handling equipment BHE coming into consideration for the respective virtual connection. Over and above this, it is assumed that a maximum bit rate is reserved for the forwarding of message cells of RT connections via the respective serving trunk arrangement A1, . . . , An, and that message cells of NRT connections are forwarded according to a statistical multiplex principle. As known, this statistical multiplex principle is based on all available resources being utilized for the transmission of message cell streams via a switching network without heeding the original traffic characteristics of the individual message cell streams. These original traffic characteristics are in turn reconstructed as needed after passing through the switching network.

Time frames that appear in periodic repetition and have a respective plurality of m time slots are thereby defined at the respective serving trunk arrangement for the forwarding of message cells. The time duration of a time slot thereby corresponds to the transmission time duration of a message cell on the respective output line arrangement, that is, one message cell is forwarded per time slot. The time duration of a time slot is also referred to below as cell cycle.

Figure 2:
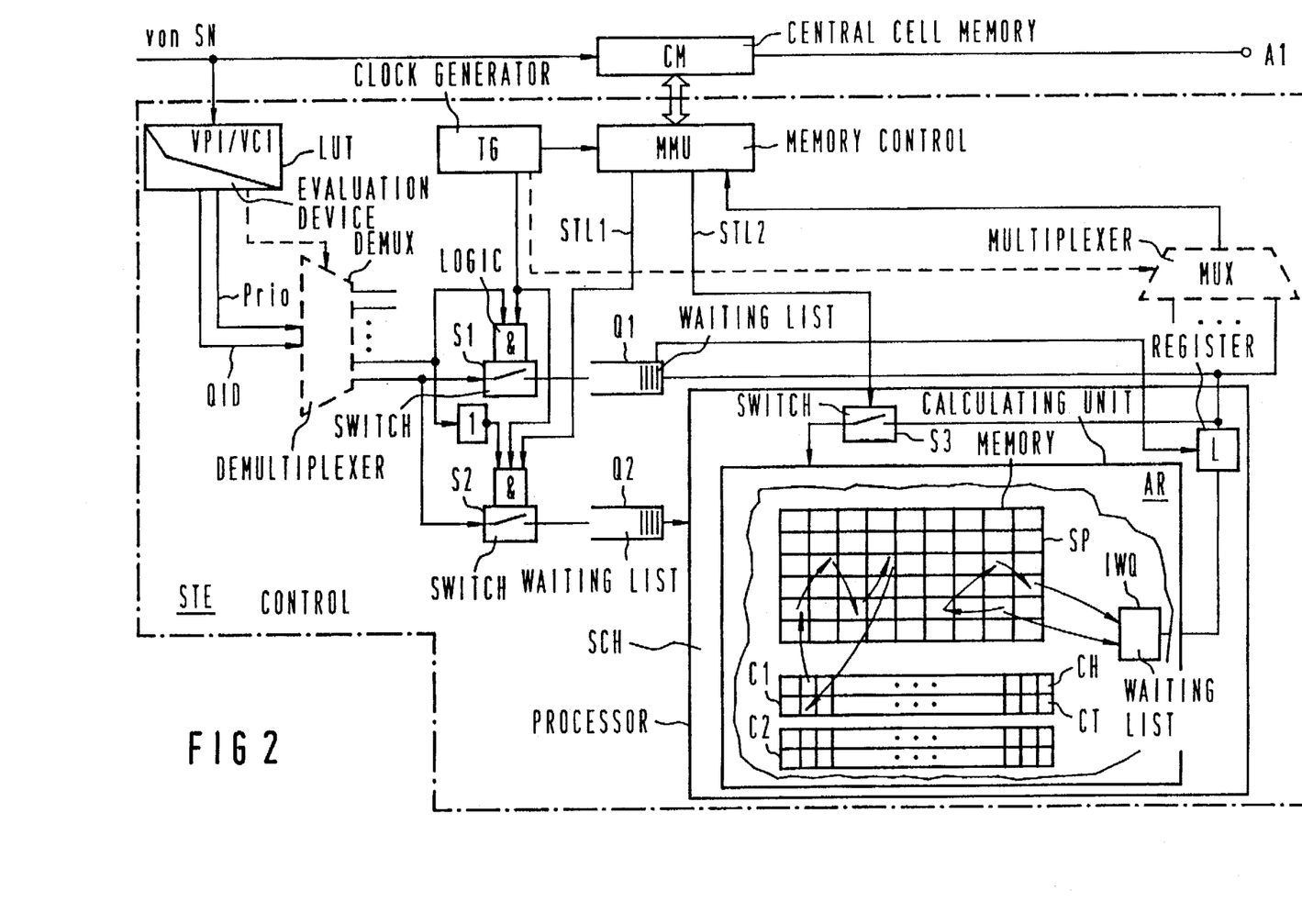
FIG. 2 shows a possible structure of one of the handling equipment merely schematically illustrated in FIG. 1.

FIG. 2 shows a possible structure of the aforementioned, identically constructed handling means with reference to the example of the handling means BHE allocated to the serving trunk arrangement A1. Only those circuit parts required for an understanding of the present invention are thereby indicated.

Accordingly, the handling means BHE contains a central cell memory CM in a first signal branch that is supplied at its input side with message cells of different virtual connections from the switching network SN indicated in FIG. 1 via a transmission line and that has its output side in communication with the serving trunk arrangement A1. Call-associated waiting lists in which the message cells of the respective virtual connection to be forwarded via the serving trunk arrangement A1 are entered are established in this cell memory. The cell memory is controlled proceeding from a control means STE that has an associated evaluation means LUT connected to the transmission line carrying the message cells and via which the evaluation means LUT is supplied with the call information VPI/VCI contained in cell headers of arriving message cells. An allocation table is maintained in this evaluation means. This allocation table unambiguously allocates a waiting list identifier QID, with which the cell waiting list coming into consideration for storing the message cell present at the moment is indicated, as well as a priority identifier to the call information VPI/VCI contained in the respective cell header. In the present exemplary embodiment, the latter, in the form of a 1-bit information, indicates whether the appertaining message cell belongs to an RT connection or to an NRT connection. This evaluation means LUT can thereby be fashioned as a memory whose memory cells can be individually randomly selected by address information derived from the call information and in which a waiting list identifier and appertaining priority number respectively allocated to one of the respective call information are stored, these being offered at the output of the memory in response to a selection.

In the present exemplary embodiment, the priority identifiers successively offered by the evaluation means are supplied to a control gate of an electronic switch S1, whereas the inverted priority identifiers are supplied to a control gate of an electronic switch S2. The switch S1 thereby represents the input of a signal branch provided for RT connections, whereas the switch S2 represents the input of a signal branch reserved for NRT connections. The breaks of these switches S1 and S2 are simultaneously supplied with the waiting list identifier belonging to the respective priority identifier, whereby one of the switches is switched conductive based on the criterion of the simultaneously offered priority identifier. In time interval in which the respective priority identifier is activated is thereby defined within an aforementioned cell cycle by a clock generator TG the control gate belonging to the respective switch. A further control line STL1, whose function shall be discussed later in detail, is thereby also conducted to the control gate of the switch S2.

A reference waiting list Q1 is provided in the signal branch for RT connections initiated by the switch S1, for example upon employment of a first-in-first-out memory into which the waiting list identifiers conducted via the switch S1 are accepted. The maximum length of this waiting list is thereby determined in conformity with the maximally permitted delay time for message cells of RT connections. The waiting list identifiers accepted into this reference waiting list are subsequently successively supplied to a memory control means MMU belonging to the control means STE, this memory control means MMU outputting address signals corresponding to these waiting list identifiers to the cell memory CM in order to respectively forward a message cell pending in the cell waiting list coming into consideration to the serving trunk arrangement A1. The respective message cell is thereby inserted into an aforementioned time slot of a time frame.

A reference waiting list Q2 that merely serves the purpose of decoupling the working clock of a processing means SCH that follows the reference waiting list from the transfer clock for the occurring message cells is provided in the signal branch for NRT connections initiated by the switch S2. On the basis of the supplied waiting list identifiers as well as the aforementioned characteristic parameters that are available for the respective NRT connection. This processing means determines the points in time for the output of the message cells stored in the cell memory CM for the respective NRT connection in order to reconstruct the traffic characteristic for the forwarding of the message cells that is defined for the respective NRT connection. Such a reconstruction can thereby be a time spacing defined by a peak bit rate is not downwardly transgressed in the output of successive message cells of one and the same NRT connection, this corresponding to a "spacing" function, or the time spacing of successive message cells is defined such that all of the above-recited characteristic parameters for the individual NRT connections are met. The latter is also referred to as "shaping". An example thereof shall be described in greater detail later.

When a reconstruction of the message cell streams of NRT connections is not provided but message cells of NRT connections are merely to be forwarded with a lower priority compared to message streams of RT connections, moreover, a first-in-first-out memory corresponding to the first-in-first-out memory Q1 can also be provided instead of the processing means SCH and the reference waiting list Q2 in the simplest case.

Independently of the fashioning of the signal branch provided for NRT connections, it is provided in the present exemplary embodiment that waiting list identifiers present in this signal branch are only forwarded to the memory control means MMU when the reference waiting list Q1 belonging to the signal branch for RT connections is empty, i.e. RT connections are assigned a higher priority. In the present exemplary embodiment, the outputs of the two signal branches for RT and NRT connections are merged, whereby the output of the signal branch for NRT connections is only enabled given an empty reference waiting list Q1 but is otherwise switched high-impedance. For this purpose, the signal branch for NRT connections is terminated with a register L whose output side can be switched high-impedance by a control signal output by the reference waiting list Q1. This control signal is always output whenever at least one waiting list identifier is still contained in this reference waiting list.

FIG. 2 also shows a demultiplexer DEMUX connected between the evaluation means LUT and the switches S1 and S2 as well as a multiplexer MUX connected between the common output of the signal branches for RT and NRT connections and the memory control means MMU. These can be used when the serving trunk arrangement A1 is composed of a bundle of parallel, individual lines and individually determined virtual connections are to be conducted thereover. In this case, one signal branch for RT connections and one signal branch for NRT connections is individually allocated in the above-described manner for each of these individual lines. The signal branches belonging to the individual lines are thereby respectively connected via their switches S1 and S2 to a predetermined output of the demultiplexer DEMUX and have their common output connected to a predetermined input of the multiplexer MUX. A particular with respect to the individual line coming into consideration for the respective connection is additionally allocated to every call information VCI/VPI in the aforementioned allocation table of the evaluation means LUT, this particular being offered at the output of the evaluation means LUT together with the appertaining waiting list identifier and priority identifier and being supplied to the demultiplexer DEMUX as control signal. The common outputs of the signal branches individually allocated to the individual lines are successively connected to the memory control means MMU vie the multiplexer MUX within a cell cycle. For this purpose, the multiplexer is supplied with appropriate control signals by the aforementioned clock generator TG.

Let it also be pointed out with respect to the handling means BHE described above with reference to FIG. 2 that the handling of two different call types, namely the handling of RT and NRT connections, has only be described as an example. Given a modification of the above-described allocation table and the addition of further priority-associated signal branches, an arbitrary plurality of different call types call also be handled priority-dependent with such a handling means.

Over and above this, let it also be pointed out that handling means corresponding to the above-described handling means BHE can also be connected between the aforementioned line units AE and the switching network SN in order to first intermediately store the message cells to be transmitted via this switching network. In this case, the handling means can respectively contain a processing means SCH that, for example, is fashioned such that message cells of NRT connections are forwarded according to an aforementioned first-in-first-out principle or according to what is referred to as a round robin principle.

An example of the aforementioned calculation of the output times of message cells belonging to NRT connections by the processing means SCH shall now be described below with reference to flowcharts shown in FIGS. 3 and 4. It is thereby assumed as an example that the characteristic parameters of peak bit rate PCR, upper limit of the sustainable bit rate SCR, burst tolerance BT and cell delay variation CDV are to be reconstructed for the respective NRT connection.

As shown in FIG. 2, the processing means SCH has a memory means SP in which a memory area is provided for each NRT connection proceeding via the appertaining serving trunk arrangement A1 and, thus, for each of the cell waiting lists of the cell memory CM. Respective waiting list identifiers for possible predecessors and/or successors yet to be explained are stored in these memory areas (which can be randomly selected according to the criterion of the waiting list identifiers supplied to the processing means SCH), as are two leaky bucket parameter sets, namely a first leaky bucket parameter set LB1 allocated to the upper limit of the sustainable bit rate SCR and to the burst tolerance BT and a second leaky bucker parameter set LB2 allocated to the peak but rate PCR and to the cell delay variation CDV. Parameter set LB1 thereby contains a momentary leaky bucket filling value $L_s$, a maximum value of the leaky bucket $S_s$ dependent on the burst tolerance BT, as well as a time value $T_{SCR}$ with which the time spacing of two successively following message cells is determined taking the upper limit of the sustainable bit rate SCR into account. In a corresponding manner, the leaky bucket parameter set LB2 contains a momentary leaky bucket filling value $L_p$, a maximum value of the leaky $S_p$ dependent on the cell delay variation CDV, as well as a time value $T_{PCR}$ with which the time spacing of two successively following message is defined taking the peak bit rate PCR into consideration. A time value LST is also maintained in common for LB1 and LB2, this indicating the last processing point in time for a message cell of the respective NRT connection. Over and above this, two system parameters CLL and LCC are globally stored in the memory means SP, whereby CLL corresponds to the aforementioned plurality m of time slots within a time frame on the serving trunk arrangement A1, whereas LCC corresponds to the time duration of such a time slot. The values $S_s$, $S_p$, $T_{SCR}$ and $T_{PCR}$, moreover, are supplied to the processing means SCH during the course of setting up the respective NCT connection, being supplied proceeding from a control means (not shown in FIG. 1) that belongs to the switching network. Since this supplying is not the subject matter of the present invention, it shall not be discussed in greater detail.

As also described below with reference to FIGS. 3 and 4, a time interval in which the appertaining message cell is to be forwarded is determined in the present exemplary embodiment based on the criterion of the just-described leaky bucket parameter sets with every forwarding of a message cell stored in the cell memory CM of the serving trunk arrangement A1, being determined by an arithmetic unit AR belonging to the processing means SCH for a message cell immediately following this message cell in the same NRT connection and, thus, in the same cell waiting list. The start of the interval and the end of the interval of such a time interval are respectively represented by one of the time slots of an aforementioned time frame. A first time table C1 ("calendar") is thereby allocated to the interval starts of the time intervals determined for the individual message cells to be forwarded, whereas a second calendar C2 is allocated to the interval ends. These calendars each have a plurality of memory elements available to them that corresponds in number to the plurality m of time slots of an aforementioned time frame. As indicated in FIG. 2, a respective readout list ("chain") is thereby kept for the individual memory elements of the calendars, the waiting list identifiers intended for the respective time slot and, thus, for the respective memory element being chained with one another therein with the assistance of the pointers stored therefor in the memory means SP. Such a readout list is characterized by a start pointer CH (waiting list identifier) and by and end pointer CT that are stored in the allocated memory element.

A modulo-m counter means whose momentary counter reading indicates the current time T and is incremented by the value "1" with every beginning of a cell cycle and that corresponds to the plurality m of memory elements respectively present in the calendars is present in the arithmetic unit AR. The calendars are driven based on the criterion of this momentary counter reading in order to read out the start and end pointers CH and CT allocated to the current time T. When these pointers indicate the presence of at least one waiting list identifier in the readout list and, thus, at least one message cell stored in a cell waiting list of the cell memory CM, the readout list coming into consideration is inserted into an output waiting list IWQ that works according to the first-in-first-out principle. A waiting list identifier is forwarded therefrom per time slot to the memory control means MMU shown in FIG. 2 in order to forward a message cell from the cell waiting list of the cell memory CM indicated by this to the serving trunk arrangement A1 in the aforementioned manner, namely when the reference waiting list Q1 (FIG. 2) allocated to the RT connections is empty. The readout lists of the calendar C2 thereby have priority over the readout lists of the calendar C1, that is, a readout list of the calendar C1 is only inserted into the output waiting list when the output waiting list is empty. Moreover, after the insertion of a readout list into the output waiting list, this readout list is initially characterized as empty in the appertaining calendar until new entries for a following time frame ensue. Over and above this, the waiting list identifiers kept in the appertaining readout list are removed, that is, chained out, from the readout list or, respectively, readout lists of the remaining calendar that come into consideration.

It is provided in the present exemplary embodiment that at most one reference is contained in the memory means SP and, thus, in the calendars C1 and C2 per cell waiting list of the cell memory CM. According to FIG. 2, this is achieved in that a control signal with which the appertaining waiting list identifier is forwarded via the switch S2 and the reference waiting list Q2 to the processing means SCH for processing, that is, for a determination of the output time, is output by the memory control means MMU via the control line STL1 only upon acceptance of a message cell into an empty cell waiting list of the cell memory CM. This ensues, for example, immediately after the setup on an NRT connection or, respectively, whenever no message cell for the respective NRT connection has arrived for a longer time.

Given acceptance of a message cell into a cell waiting list already filled with at least one message cell, by contrast, the switch S2 is inhibited by an appropriate control signal on the control line STL1, so that the appertaining waiting list identifier is destroyed. In this case, however, a copy of the appertaining waiting list identifier is returned to the arithmetic unit AR with the output of a waiting list identifier to the memory control means MMU and, thus, with the forwarding of a message cell allocated to this waiting list identifier to the serving trunk arrangement A1, a new output time being allocated in the above-recited manner therewith on the basis of the current time T of the waiting list identifier that is present at this very moment. For this purpose, a return line is conducted from the output of the register L shown in FIG. 2 to the arithmetic unit AR, which is activated via a switch S3 only upon output of a message cell to the serving trunk arrangement A1 and a cell waiting list that remains filled. This switch is controlled via a control line ST2 proceeding from the memory control means MMU.

Following the general description of the determination of the output time for message cells accepted into the cell memory CM, this determination by the arithmetic unit AR according to the measure of the aforementioned leaky bucket parameters shall now be explained in greater detail with reference to the flowchart of FIG. 3.

The leaky bucket filling values $L_s$, and $L_p$ represent the times after whose expiration the allocated cell waiting list of the cell memory CM would be emptied via the serving trunk arrangement A1 is this cell waiting list had been hypothetically serviced with exactly the upper limit of the sustainable bit rate or, respectively, the peak bit rate. In the left branch of the flowchart, which shows the operations of the leaky bucket allocated to the upper limit of the sustainable bit rate SCR and to the burst tolerance BT, the leaky bucket filling level $L_s$ is first decremented by a value (T−LST) at the current time T of the output of a message cell to the serving trunk arrangement A1, this value (T−LST) corresponding to the outflow quantity of message cells from the allocated cell waiting list in the time interval between the last processing time LST of a message cell and the current time T if message cells were to be transmitted with the upper limit of the sustainable bit rate (SCR). A check is thereby made to see whether the value of $L_s$ resulting therefrom is negative. When this is the case, then $L_s$ is set to the value="0". only a value "0" or a positive value is allowed. The value of $L_s$ resulting therefrom is then incremented by the time value $T_{SCR}$ with which, as already mentioned above, the time spacing between two successively following message cells of the same NRT connection is determined, taking the upper limit of the sustainable bit rate SCR into account. Subsequently, the current value $L_s$ is retained for a following determination, and a delay time $DNT_{BT}$ is additionally acquired by subtracting the maximum value of the leaky bucket $S_s$ from this value $L_s$. The delay time is thereby also set to the value "0" in case a negative value derives for the delay time.

In the middle branch of the flow chart, which shows the operations of the leaky bucket allocated to the peak bit rate PCR and the cell delay variation CDV, a delay time $DNT_{CDV}$ is determined in a corresponding way, merely with the difference that the leaky bucket filling value $L_p$, the maximum value $S_p$, as well as a time value $T_{PCR}$ are utilized here. The latter, as already mentioned above, determines the time spacing between two successively following message cells of the same NRT connection, taking the peak bit rate PCR into account.

Following upon the calculation of the delay times $DNT_{BT}$ and $DNT_{CDV}$ in the left and middle branch of the flowchart, the value LST is first set to the value of the current time T and is retained for a following determination. Subsequently, the greater of the two delay times $DNT_{BT}$ and $DNT_{CDV}$ is selected, and that time slot $CSN_B$ at which the message cell present at the moment is to be forwarded at the earliest is determined therefrom, taking the current time T and the aforementioned length CLL of a time frame and, thus, the calendar as well as the length of a time slot LCC into account.

Over and above this, a point in time $VST_s:=(L_s+T)$ at which the message cell present at the moment is to be forwarded to the serving trunk arrangement A1 at the latest in order to assure the maximum spacing of two successively following message cells of one and the same NRT connection less than or equal to $T_{SCR}$ is determined on the basis of the current time T and the current value for $L_s$ previously calculated in the left branch of the flowchart at point A. The smaller value of this point in time and the point in time (T+CLL−LCC) that can be maximally represented in the calendars C1 and C2 is selected, and that time slot $CSN_E$ at which the message cell present at the moment is to be forwarded at the latest is determined, taking the current time T and the aforementioned length CLL of a time frame and, thus, of the calendar as well as the length of a time slot LCC into account.

The determination of a time interval for the forwarding of a message is thus ended and entries into the readout lists of the calendars C1 and C2 merely have to be undertaken in the aforementioned way.

Figure 3:
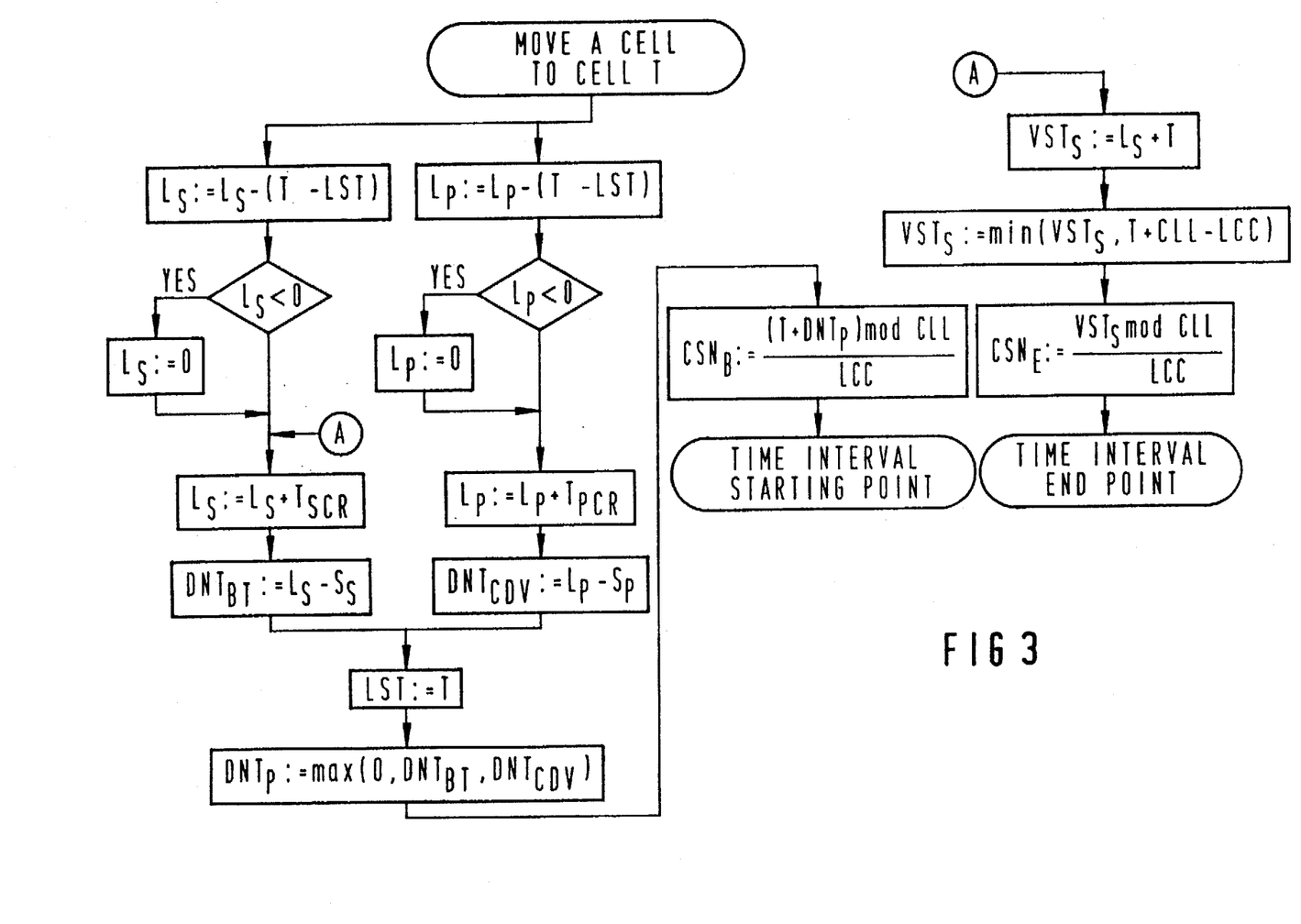
FIGS. 3 and 4 show flowcharts depicting the method of the present invention.
Figure 4:
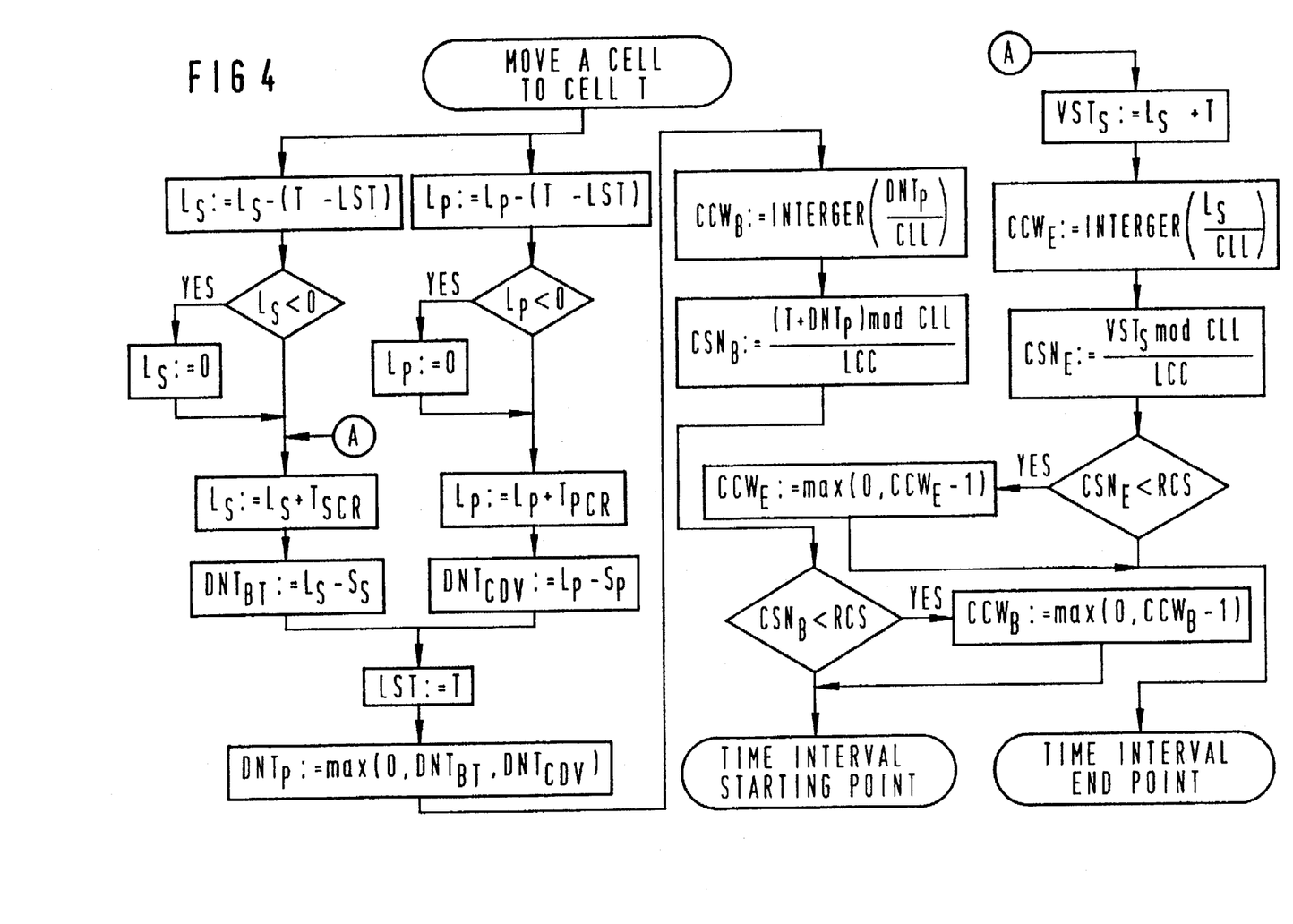

The flowchart shown in FIG. 4 essentially corresponds to the flowchart shown in FIG. 3. It is assumed therein that the aforementioned calendars and, thus, the modulo-m counter means comprise a short cycle, and the leaky bucket parameters of one of the cell waiting lists are updated during the course of a refresh in a predetermined time slot (RCS) of this cycle.

With the determination of the time slot $CSN_B$ (FIG. 3), the plurality of cycles that are required for the realization of the delay time is additionally calculated by division of the delay time $DNT_P$ by the length CLL of the calendars. The time slot $CSN_B$ is immediately taken into consideration given a value $CCW_B=$"0". Otherwise, the value $CCW_B$ together with the determined time slot $CSN_B$ and the other leaky bucket parameters for the respective NRT connection are stored in the memory means SP.

In a corresponding way, with the determination of the time slot $CSN_E$ (FIG. 3), the plurality of cycles that are required for the realization of the delay time $CSN_E$ is additionally calculated by division of the value by the length CLL of the calendars C1 and C2. The time slot $CSN_E$ is immediately taken into consideration given a value $CCW_E=$"0". Otherwise, the value $CCW_E$ together with the determined time slot $CSN_E$ and the other leaky bucket parameters for the respective NRT connection are stored in the memory means SP.

The stored values for $CCW_B$ and $CCCW_E$ are respectively decremented by the value "1" with each refresh. Only given a value "0" are the previously determined time slots $CSN_B$ and $CSN_E$ in the calendars C1 and C2 then taken into consideration. This procedure yields the advantage that the length of the calendars can be minimized.

In conclusion, let it also be pointed out with respect to the control executions explained with reference to the flowcharts in FIGS. 1 and 2 that these assure a forwarding of message cells of an NRT connection taking the declared peak bit rate (PCR), the upper limit of the sustainable bit rate (SCR), the burst tolerance (BT) and the cell delay variation (CDV) into consideration. If, however, only some of these parameters are to be assured for such a forwarding, only the control executions relevant thereto in the flowcharts need be utilized.

The invention is not limited to the particular details of the method depicted and other modifications and applications are contemplated. Certain other changes may be made in the above described method without departing from the true spirit and scope of the invention herein involved. It is intended, therefore, that the subject matter in the above depiction shall be interpreted as illustrative and not in a limiting sense.

What is claimed is:

1. A method for forwarding message cells transmitted via an ATM communication equipment operating according to an asynchronous transfer mode during virtual connections to a respective serving trunk for an associated respective virtual connection, comprising the steps of:

determining characteristic parameters for the respective virtual connection during a call setup according to traffic characteristic of a message cell stream to be transmitted;

determining a respective time interval for each message cell, in the message cell stream, based on the criterion of said characteristic parameters for forwarding each message cell transmitted via the ATM communication equipment to the respective serving trunk;

only calculating the time interval for a respective message cell with the forwarding of a message cell, in the message cell stream, immediately preceding said respective message cell in a common virtual connection;

the characteristic parameters for the individual connections being a peak bit rate, an upper limit of a sustainable bit rate, a burst tolerance and a cell delay variation;

determining a start time of the respective time interval according to a criterion of the peak bit rate, the burst tolerance and the cell delay variation; and determining an end time of the respective time interval according to a criterion of the upper limit of the sustainable bit rate.

2. The method according to claim 1, wherein a time value indicating the last processing time of a message cell, a first leaky bucket parameter set allocated to the upper limit of the sustainable bit rate and to the burst tolerance, a second leaky bucket parameter set allocated to the peak bit rate and the cell delay variation are maintained for each virtual connection of the virtual connections;

wherein the first leaky bucket parameter set comprises, as parameters, a momentary filling value of the leaky bucket thereof, a maximum value of the leaky bucket thereof dependent on the burst tolerance and a first time value, said first time value corresponding to time spacing of two successive message cells, taking the upper limit of the sustainable bit rate into account;

wherein the second leaky bucket parameter set comprises, as parameters, a momentary filling value of the leaky bucket thereof, a maximum value of the leaky bucket thereof dependent on the cell delay variation and a second time value, said second time value corresponding to time spacing of two successive message cells, taking the peak bit rate into account;

wherein the filling value is decremented to a time indicator value at a time of forwarding of an immediately preceding message cell to the respective cell for determining the respective time interval for the forwarding of the respective message cell, wherein a value resulting therefrom is incremented as the current filling value and wherein a delay value is subsequently formed;

wherein the filling value is decremented to the time indicator value, wherein a value resulting therefrom is incremented as the current filling value, and wherein a delay value is subsequently formed;

wherein the time value is set to the time indicators value for a following determination and wherein a greater of the delay values is selected as the starting time of the respective time interval;

wherein the end time of the respective time interval is determined from the current filling value.

3. The method according to claim 1, wherein the message cells to be forwarded in the course of virtual connections pass through call-associated cell waiting lists;

wherein only one respective reference is kept for each cell waiting list that is not empty;

wherein a time interval during a next message cell, pending for forwarding in the associated cell waiting list is to be read out, is defined for a respective reference of a respective cell.

4. The method according to claim 3, wherein first and second calendars are kept for forwarding message cells, each calendar having a fixed time length and a plurality of time slots whose time length corresponds to a transmission time of a message cell on the respective serving trunk;

wherein the first calendar is allocated to start times of time intervals, and wherein the second calendar is allocated to end times of time intervals;

wherein the respective reference to a respective cell waiting list of the first and second cell waiting lists is respectively entered into a readout list of a time slot of one of the first and second calendars for the appertaining start time or, respectively, end time, the respective being entered therein according to a criterion of the start time and end time of the time interval calculated therefor; and wherein the respective reference in a readout list a respective calendar of the first and second calendars is taken into consideration dependent on a current traffic load.

5. The method according to claim 1, wherein first and second separate leaky bucket parameter sets are maintained for each virtual connection for the determination of a start time and an end time, respectively, of a time interval of a message cell;

wherein two separate calendars, respectively isochronically cycling with a uniform defined cycle and each having a respectively fixed plurality of time slots, are maintained for the start times and the end times, respectively;

wherein the first and second leaky bucket parameter sets are updated for the respective virtual connection of a predetermined time slot;

wherein a number of cycles of the first and second calendars respectively devolving to the start time and the end time, respectively, is determined in the determination of a time interval and wherein corresponding numerical values are maintained call-associated;

wherein the numerical values being maintained are respectively decremented by a value "1" with every updating of the leaky bucket parameter sets for the respective call; and wherein a previously determined start time or, respectively, end time in a respective calendar of the first and second calendar is only taken into consideration given a numerical value of "0".

6. A circuit arrangement for forwarding message cells transmitted via an ATM communication equipment working according to an asynchronous transfer mode during the course of virtual connections to a respective serving trunk for an associated respective virtual connection, comprising:

characteristic parameters for the respective virtual connection, the characteristic parameters being determined by the ATM communication equipment during a call setup according to a traffic characteristic of a message cell stream to be transmitted;

a handling device for determining time interval for forwarding each message cell transmitted via the ATM communication equipment to the respective serving trunk the handling device being allocated to the respective serving trunk for each message cell based on a criterion of characteristic parameters previously supplied from the ATM communication equipment; and the handling device having a processing device that is structured such that the time interval for the respective message cell is only calculated with a forwarding of a message cell immediately preceding the respective message cell in a common virtual connection, the characteristic parameters for the individual connections being a peak bit rate, an upper limit of a sustainable bit rate, a burst tolerance and a cell delay variation, and the time interval having a start time that is determined according to a criterion of the peak bit rate, the burst tolerance and the cell delay variation, and the time interval having an end time that is determined according to a criterion of the upper limit of the sustainable bit rate.

7. A method for forwarding message cells transmitted via an ATM communication equipment operating according to an asynchronous transfer mode during virtual connections to a respective serving trunk for an associated respective virtual connection, comprising the steps of:

determining characteristic parameters for the respective virtual connection during a call setup according to traffic characteristic of a message cell stream to be transmitted;

determining a respective time interval for each message cell, in the message cell stream, based on the criterion of said characteristic parameters for forwarding each message cell transmitted via the ATM communication equipment to the respective serving trunk;

only calculating the time interval for a respective message cell with the forwarding of a message cell, in the message cell stream, immediately preceding said respective message cell in a common virtual connection;

the characteristic parameters for the individual connections being a peak bit rate, an upper limit of the sustainable bit rate, a burst tolerance and a cell delay variation;

maintaining a time value indicating the last processing time of a message cell, a first leaky bucket parameter set allocated to the upper limit of the sustainable bit rate and to the burst tolerance, a second leaky bucket parameter set allocated to the peak bit rate and the cell delay variation for each virtual connection of the virtual connections;

the first leaky bucket parameter set having, as parameters, a momentary filling value of the leaky bucket thereof, a maximum value of the leaky bucket thereof dependent on the burst tolerance and a first time value, said first time value corresponding to time spacing of two successive message cells, taking the upper limit of the sustainable bit rate into account;

the second leaky bucket parameter set having, as parameters, a momentary filling value of the leaky bucket thereof, a maximum value of the leaky bucket thereof dependent on the cell delay variation and a second time value, said second time value corresponding to time spacing of two successive message cells, taking the peak bit rate into account;

decrementing the filling value to a time indicator value at a time of forwarding of an immediately preceding message cell to the respective cell for determining the respective time interval for the forwarding of the respective message cell, a value resulting therefrom being incremented as the current filling value and a delay value being subsequently formed;

decrementing the filling value to the time indicator value, a value resulting therefrom being incremented as the current filling value, and a delay value being subsequently formed;

setting the time value to the time indicators value for a following determination and selecting a greater of the delay values as the starting time of the respective time interval;

determining the end time of the respective time interval from the current filling value.

8. The method according to claim 7, wherein the message cells to be forwarded in the course of virtual connections pass through call-associated cell waiting lists;

wherein only one respective reference is kept for each cell waiting list that is not empty;

wherein a time interval during a next message cell, pending for forwarding in the associated cell waiting list is to be read out, is defined for a respective reference of a respective cell.

9. The method according to claim 8, wherein first and second calendars are kept for forwarding message cells, each calendar having a fixed time length and a plurality of time slots whose time length corresponds to a transmission time of a message cell on the respective serving trunk;

wherein the first calendar is allocated to start times of time intervals, and wherein the second calendar is allocated to end times of time intervals;

wherein the respective reference to a respective cell waiting list of the first and second cell waiting lists is respectively entered into a readout list of a time slot of one of the first and second calendars for the appertaining start time or, respectively, end time, the respective being entered therein according to a criterion of the start time and end time of the time interval calculated therefor; and wherein the respective reference in a readout list a respective calendar of the first and second calendars is taken into consideration dependent on a current traffic load.

10. The method according to claim 7, wherein first and second separate leaky bucket parameter sets are maintained for each virtual connection for the determination of a start time and an end time, respectively, of a time interval of a message cell;

wherein two separate calendars, respectively isochronically cycling with a uniform defined cycle and each having a respectively fixed plurality of time slots, are maintained for the start times and the end times, respectively;

wherein the first and second leaky bucket parameter sets are updated for the respective virtual connection of a predetermined time slot;

wherein a number of cycles of the first and second calendars respectively devolving to the start time and the end time, respectively, is determined in the determination of a time interval and wherein corresponding numerical values are maintained call-associated;

wherein the numerical values being maintained are respectively decremented by a value "1" with every updating of the leaky bucket parameter sets for the respective call; and wherein a previously determined start time or, respectively, end time in a respective calendar of the first and second calendar is only taken into consideration given a numerical value of "0".

* * * * *